United States Patent [19]
Spicer et al.
[11] 3,855,023
[45] Dec. 17, 1974

[54] MANUFACTURE OF MASKS

[75] Inventors: Denis F. Spicer; Andrew C. Rodger, both of Bedford, England

[73] Assignee: Texas Instruments Incorporated, Dallas, Tex.

[22] Filed: Aug. 21, 1973

[21] Appl. No.: 390,275

Related U.S. Application Data

[63] Continuation of Ser. No. 180,776, Sept. 15, 1971, abandoned.

[52] U.S. Cl. .................... 156/11, 96/36.2, 117/211, 117/212, 117/217, 156/13, 156/345, 250/49.5
[51] Int. Cl. .............................................. C23f 1/07
[58] Field of Search ............... 117/8, 211, 212, 217; 156/3, 8, 11, 13, 345; 96/36.2, 38.4; 250/49.5

[56] References Cited

UNITED STATES PATENTS

| | | | |
|---|---|---|---|
| 3,535,137 | 10/1970 | Haller et al. | 156/3 X |
| 3,679,497 | 7/1972 | Handy et al. | 156/8 X |

*Primary Examiner*—William A. Powell
*Attorney, Agent, or Firm*—Harold Levine; James Comfort; Richard Donaldson

[57] ABSTRACT

A method of, and apparatus for, fabricating masks in which the mask pattern is defined by electron beam exposure of electron beam sensitive resist on a surface of a mask blank. A metal layer on the mask blank incorporates reference markings which cause changes in secondary electron emission during scanning of the electron beam to effect the desired exposure pattern, from which correction signals are derived. The correction signals are used to adjust the electron beam deflection throughout the exposure process so that the final exposed pattern is accurately aligned with reference markings. A metal layer is then formed on the resist and the unexposed portions of the resist, as well as unoverlying and underlying metal areas, are removed to leave a metal pattern on the mask blank corresponding with the pattern exposed in the resist.

The deflection of the electron beam to expose the desired pattern is controlled in response to information representing the patterns stored in a digital computer. Preferably the electron beam machine incorporates a dynamic focussing system for correcting defocussing of the electron beam due to astigmatism and curvature of the projection lens.

9 Claims, 4 Drawing Figures

PATENTED DEC 17 1974 3,855,023

SHEET 1 OF 3

MANUFACTURE OF MASKS

This is a continuation, division, of application Ser. No. 180,776, filed Sept. 15, 1971, now abandoned.

This invention relates to the manufacture of masks and in particular masks suitable patterning pattering in the production of an integrated circuit, for example.

In the manufacture of integrated circuits it is desirable to be able to produce masks for the patterning of regions of diffusion or conductors for example, and while such a circuit is under development a number of changes in the masks may have to be made whilst seeking to obtain the desired performance from the circuit. The technique for the manufacture of such masks used hitherto has been to form the mask on a large scale, say 100 to 1,000 times larger in each direction than the required mask and then produce the mask by photographic reduction. However, with the increasing elaboration of masks for M.S.I. and L.S.I. circuits the production of masks by this method can be very lengthy and moreover sufficient errors may be introduced to interfere with the operation of the circuit produced from the mask, especially bearing in mind that pattern part sizes of a few microns only are sometimes required.

It is an object of the present invention to provide a method of manufacturing masks for the production of integrated circuits which is both accurate and able readily to allow changes in geometry of the masks produced.

According to one aspect of the present invention there is provided a method of manufacturing a mask suitable for use in the production of an integrated circuit, for example, in which a mask blank having an array of reference markings and coating of electron bombardment sensitive resist is subjected to a desired pattern of electron bombardment by deflection of an electron beam referred to the array of reference markings and the mask is formed on the blank according to the exposed resist. The reference markings may, for example, be formed by etching in a metal film on the mask blank before it is coated with the resist and the reference markings may conveniently be detected by secondary electron emission as a result of bombardment by the electron beam somewhat on the principle of a scanning electron microscope; in this way the corrections of the deflection of the electron beam can be made accurately because the same mechanism is used for detecting the reference markings as for exposing the resist.

According to another aspect of the invention there is provided apparatus for exposing an electron bombardment sensitive resist on a mask blank to selective electron bombardment in accordance with a desired pattern, the mask blank having reference markings, in which the apparatus includes means for generating an electron beam, means for deflecting the beam over the mask blank, secondary or back scattered electron sensitive means for detecting the reference markings when scanned by the electron beam and means for generating deflection signals for the electron beam according to the desired pattern, the generating means being responsive to the secondary electron sensitive means to effect correction of the deflection signals according to the reference markings.

In order that the invention may be fully understood and readily carried into effect it will now be described with reference to the accompanying drawings of which:

Figure 1:
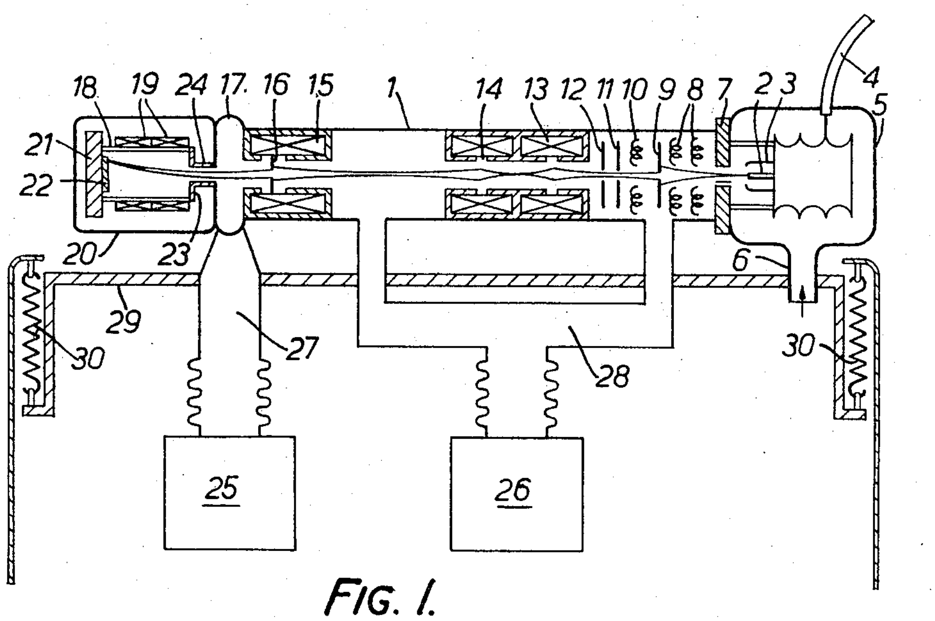
FIG. 1 is a diagram of one example of apparatus to the invention.

In general terms the apparatus of FIG. 1 is used to expose a desired pattern on an electron bombardment sensitive resist on a mask plate by deflection of the electron beam in response to information representing the pattern stored in a general purpose digital computer. Techniques for organizing a computer to perform such operations have been proposed and will not, therefore, be described in detail in this Specification. In order to ensure accuracy in the positioning and scale of the pattern the mask blank carries an array of reference markings, which are detected by secondary electron emission, and correction signals are generated within the computer in response to these reference markings to improve the accuracy of the deflection. These correction signals may be used in several ways; for example, they could be employed to modify the information stored in the computer so that the computer-electron beam machine interface (represented for one co-ordinate by FIGS. 3 and 4) is not changed, or amplifiers within the interface circuitry could be controlled by the correction signals generated by the computer to modify the deflection signals generated in response to the information output from the computer.

FIG. 1 shown in diagrammatic form one example of an electron beam machine for the production of integrated circuit masks according to the invention. In this machine the column 1 is mounted horizontally with an electron gun including a cathode 2 at one end. Preferably, the cathode includes an electron emitter of lanthanum hexaboride ($LaB_6$). Adjacent to the cathode 2 are beam-forming electrodes 3 which form the electrons into a beam directed along the column 1. E. H. T. supplies for the gun are fed along a cable 4 and the gun is provided with an anti-corona shield 5 into which air is driven through the tube 6 to cool the gun. The gun is separated from the remainder of the column by an isolation valve 7 which enables the gun to be maintained under vacuum whilst the remainder of the column is opened to the atmosphere for maintenance; of course, this valve is always open during operation of the machine. After passing through the valve 7 the electron beam is then aligned by means of alignment coils 8 and is directed to a first beam-defining aperture 9 which restricts the beam to a very small diameter by permitting only those electrons of the beam close to the axis to be propagated along the column. For blanking the beam there are provided beam-blanking coils 10 and a blanking aperture 11 which co-operate to enable the beam to be stopped at the aperture 11 by deflecting the beam as a result of energization of the blanking coils 10 so that the beam no longer passes through the aperture 11. The beam then passes through a second beam-defining aperture 12 and to condenser lenses 13 and 14. From the lens 14 the beam passes to a projector lens 15 which includes a final beam-defining aperture 16. The lens 15 is followed by a column isolation valve 17 provided to enable the maintenance of a vacuum in the column 1 when a target chamber 18 adjacent to the valve 17 is let down to atmospheric pressure for the purpose of changing the target. The target chamber 18 is a glass tube around which are provided deflection coils 19. The target chamber 18, deflection coils 19 and other components associated therewith are enclosed within a magnetic screen 20. At one end of the chamber 18 is mounted a cassette 21 for an electron sensitive plate, which is shown exposed by the cassette at 22. At the other end of the tube 20 there is provided a detector 23 for secondary or back scattered electrons (for convenience in the description only secondary electrons are referred to, although either type of electron emission can be used) emitted from the electron sensitive plate and between the detector 23 and the valve 17 there is provided an astigmatism corrector 24 around a narrow tubular portion at the entrance to the chamber 18. The detector 23 may conveniently consist of a Faraday cage containing a region of scintillator material coated with a thin film of aluminum maintained at a high potential, a photo multiplier being provided to observe the light flashes produced by the scintillator when bombarded by electrons. Two vacuum pumps 25 and 26 are provided connected respectively by manifolds 27 and 28 to the target chamber 18 and the column 1. The machine is mounted on a base plate 29 which is supported on springs 30 to reduce mechanical shocks on the machine due to vibrations of the floor on which it stands whilst the machine is in operation, thereby avoiding errors in the positioning of the beam during exposure of a resist due to such vibrations.

The electron gun typically produces a beam of 10 KeV energy which beam is focussed by the two short focal length condenser lenses 13 and 14 and the long focal length projector lens 15 to a fine probe of about $2\mu$ diameter. The beam emitter from the electron gun diverges in a narrow angle from a virtual source of between 25 and $50\mu$ diameter and the effect of the condenser and projector lenses is to demagnify the electron gun virtual course to produce an image in the form of the electron probe. To obtain a probe diameter of $2\mu$ a demagnification of about fifty times is required to allow for the increase in probe diameter due to the spherical abberation in the projector lens. It is possible that this demagnification can be obtained with one condenser lens instead of two, but for some applications it is probable that a smaller electron probe than $2\mu$ diameter would be required and, therefore, the column includes two condenser lenses 13 and 14. The projector lens 16 has a focal length of 5 to 6 inches and operates at unit magnification to provide an electron probe of about 10 inches working distance. This long working distance is required because of the relatively large area to be scanned without excessively large scanning angles.

The machine described above is intended to expose the whole of a 2 inch × 2 inch mask plate using as an electron sensitive resist polymethylmethacrylate having an exposure sensitivity of $10^{-4}$ coulombs per square cm. for an electron beam of energy 10 KeV. With a conventional tungsten cathode such a resist would require an exposure time of around 1,000 minutes for full exposure; although most photo-masks require only between 10 and 20 percent of the mask area to be exposed, so that the practical exposure time using a tungsten cathode lies between 100 and 200 minutes. However, the electron gun proposed for use in the machine described above employs a lanthanum hexaboride cathode which can produce a much higher beam current than a tungsten cathode, so that probe currents of 500 nano amps are available in a $2\mu$ diameter probe leading to practical exposure times of about 10 to 20 minutes for a mask plate. It is, of course, probable that more sensitive electron-sensitive resists will be available in time so that the exposure time can be reduced further.

The electron optical column of the machine described above is about 5 feet long so as to obtain sufficient demagnification of the image of the electron gun virtual source. Since the exposure time is about 10 to 20 minutes per mask plate it is not necessary to have an elaborate work chamber with a magazine of work plates for exposure and, therefore, the use of a horizontal column becomes more practical and has several advantages. The target chamber 18 contains simply the glass flight tube surrounded by the deflection coils 19 with the secondary electron detector 23 and the astigmatism corrector 24 at one end and the cassette 21 at the other end containing the mask plate 22 to be exposed. The cassette 21 may be arranged to pre-align the mask plate within 25 to $50\mu$ of a datum position. The column isolation valve 17 enables the cassette 21 to be changed without breaking the column vacuum and the very small volume of the target chamber 18 means that the machine can rapidly be pumped down to working pressure after change of the cassette. The horizontal arrangement of the machine enables short pumping lines to be used and thereby shortens the time for pumping down to a working pressure of about $10^{-7}$ torr.

Most conveniently the various electron optical components forming the machine could be made as separate sections with standard flanges enabling the components to be bolted together after manufacture. It is possible to construct a column in this way so that it can be disassembled and reassembled without losing mechanical accuracy. Although they are not shown in FIG. 1, mechanical jacks would be provided to support the column, thereby to reduce the mechanical loads on it and subsequent misalignment due to bending of the column. It should be appreciated that FIG. 1 is purely diagrammatic and that preferably the beam alignment and blanking coils 8 and 10 would be mounted outside the vacuum of the machine to avoid contamination problems and reduce the volume to be kept under vacuum, the wall of the vacuum envelope adjacent to these coils being glass with a very thin stainless steel lining tube which would be readily replaceable if contaminated after long use. In addition all of the beam-defining apertures 9, 12 and 16 as well as the blanking aperture 11 would be prealigned in the construction of the column and would be readily replaceable.

As it is difficult to design deflection coils for both good linearity and negligible astigmatism at the same time it is desirable to employ a system for correcting for defocussing of the probe due to astigmatism and curvature of the projector lens. One suitable system is described in copending British Pat. application No. 49919/69 and will not be described in this Specification. Preferably the astigmatism corrector 24 consists of corrector coils energized by signals derived from the deflection signals applied to the deflection coils 19. The coils for effecting the magnetic astigmatism correction would be outside the vacuum envelope. The astigmatism corrector coils need not be placed in the position shown in FIG. 1 but could alternatively be positioned between the condenser and the projector lenses.

It is intended that the machine described above should achieve a pattern accuracy of $1\mu$ but it was found that relying solely on the repeatability of a pattern generator and the deflection coils such accuracy could not be obtained. Therefore, positioning information feedback from the mask plate is used to correct the position of the probe on the plate and thereby achieve the desired accuracy. The feedback information is derived from the mask plate by scanning microscope techniques using secondary electrons emitted from the mask plate as a result of bombardment by the electron probe, these secondary electrons being picked up by the detector 23 and the resulting electrical signals amplified and after conversion to digital form are fed to the computer for the production of correction signals. In order to make use of this facility the mask plate is provided with reference markers formed on the plate by the use of a precision master using optical or electron beam exposure of a resist to form the marks.

Figures 2A, 2B, 2C, 2D, 2E, 2F, 2G, 2H, 2I, 2J, 2K, 2L, 2M, 2N:
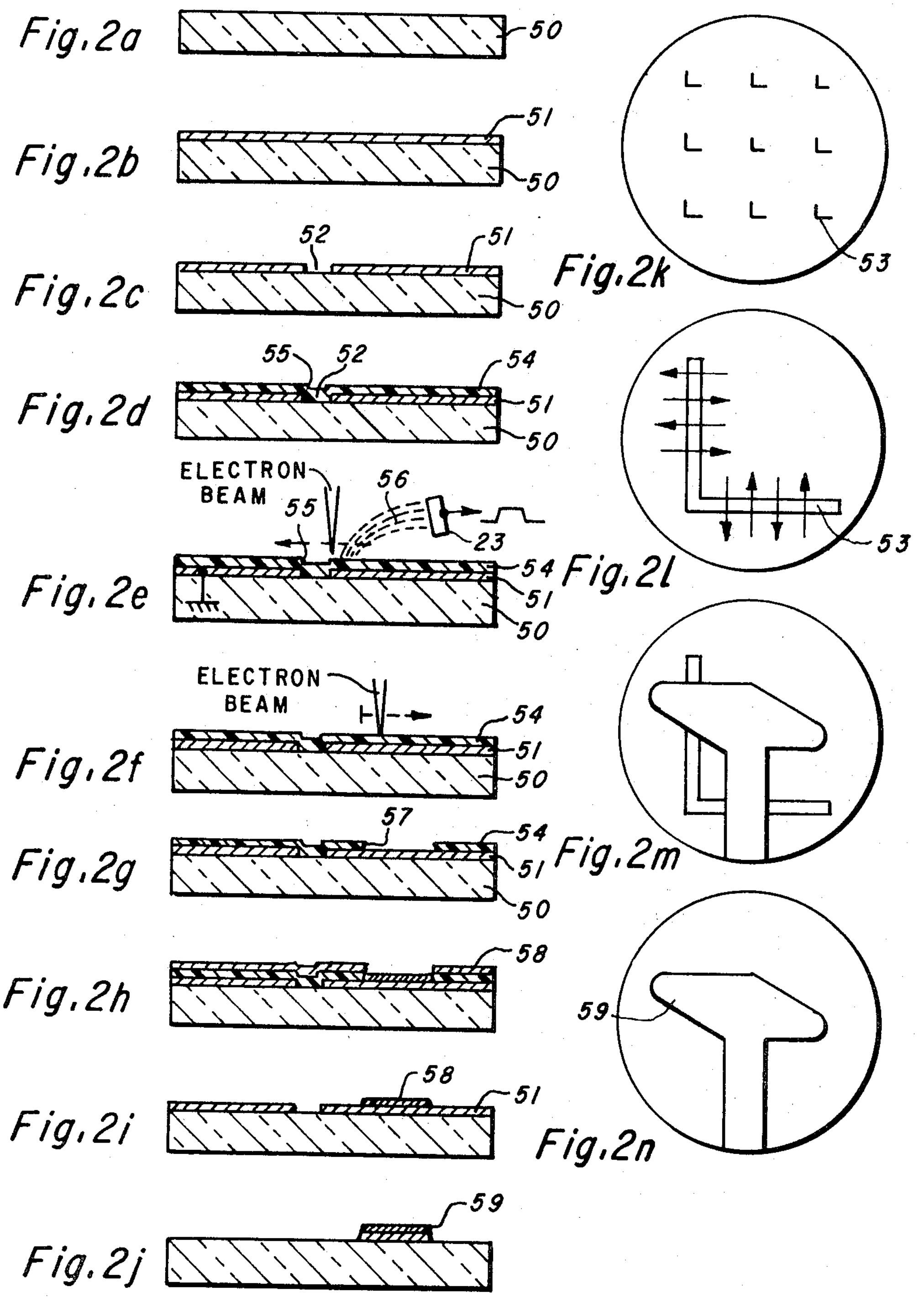
FIG. 2 shows successive stages in the manufacture of a mask according to an example of a method of the present invention.

FIG. 2 shows various stages in the manufacture of a mask using the machine described above with reference to FIG. 1. The mask plate is formed from a glass plate 50 shown at FIG. 2*a*, which is coated with a metal layer 51, for example by evaporation, as shown in FIG. 2*b*. Reference markers 52 are etched in the layer 51 by the use of a precision master using optical or electron beam exposure of a resist followed by a conventional etching step and removal of the resist. A convenient form for the reference marks is an L-shape as shown at 53 in FIG. 2*k*. Typically these marks are arranged in a square array with a row and column spacing of 2.5mm. The metal layer 51 with the marks 52 is then coated with a film of polymethylmethacrylate resist 54 as shown in FIG. 2*d;* the layer of resist, being of approximately uniform thickness, has a dip 55 in its surface where reference mark 52 was etched into the layer 51. The mask plate is now ready for insertion into the electron beam machine.

As stated above, the mechanical construction of the cassettee 22 and its mounting at the end of the target chamber 18 (FIG. 1) is such that a positional accuracy of 25 to $50\mu$ is achieved and the exact position of the mask to an accuracy of better than $1\mu$ is ascertained by scanning the reference marks 52, 53 with the electron probe. As the probe passes over the surface of the film 54 of resist secondary electrons as represented at 56 in FIG. 2*e* are produced and picked up by the detector 23 (see FIG. 1 as well). The dip 55 in the surface of the layer 54 over a reference mark causes a change in the number of secondary electrons emitted, so that the detector 23 produces a corresponding video waveform. During this scanning by the electron beam the metal layer 51 is connected to earth to prevent the mask charging up due to impingement on it of the electrons in the scanning beam, which charge would interfere with the video waveform produced by the detector 23.

As shown by the arrows in FIG. 21, the scan by the electron probe is across the limbs of the L-shaped marker 53 and the video waveform so produced is used to provide control signals representing the X and Y coordinate positions of the vertex of the marker. This information is stored in a digital computer and utilized as described below for correcting the deflection waveform subsequently generated so that the mask is exposed in the desired position; this procedure being represented diagrammatically in FIG. 2*f*. After exposure of the electron sensitive resist layer 54 it is developed resulting in the removal of exposed portions such as 57 shown in FIG. 2*g*. A metal layer 58 is then evaporated or sputtered on to the surface of the plate (FIG. 2*h*) over the resist and the remaining resist stripped from the plate by means of a suitable solvent leaving the metal layer 58 only where it was in contact with the layer 51 (FIG. 2*i*), that is to say where the resist 54 was exposed by the electron beam and the resist removed by the developing process. As the final stage in the production of the mask shown in FIG. 2*j* the metal of the layer 51 is removed by etching using an etchant which does not attack the metal of the layer 58, thus leaving metal only where the resist was exposed by the electron beam, that is at 59 as shown in FIG. 2*j* and FIG. 2*n*. It should be noted that, as is illustrated in FIG. 2*m*, the mask pattern may intersect the reference markers if necessary although it is not desirable that it should do so.

The metal layer 51 may, for example, be of gold and the metal layer 58 of aluminum or chromium.

Figure 3:
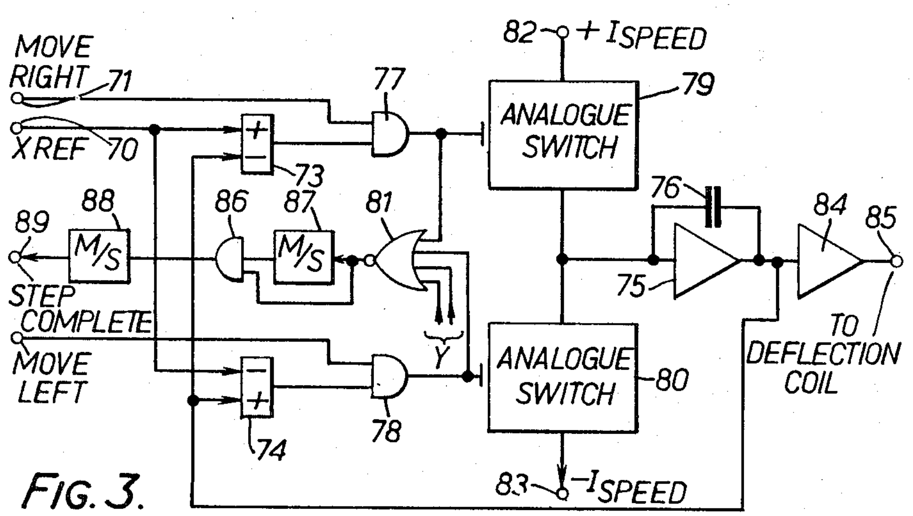
FIG. 3 shows analogue circuitry for controlling deflection of the electron beam in one co-ordinate direction.
Figure 4:
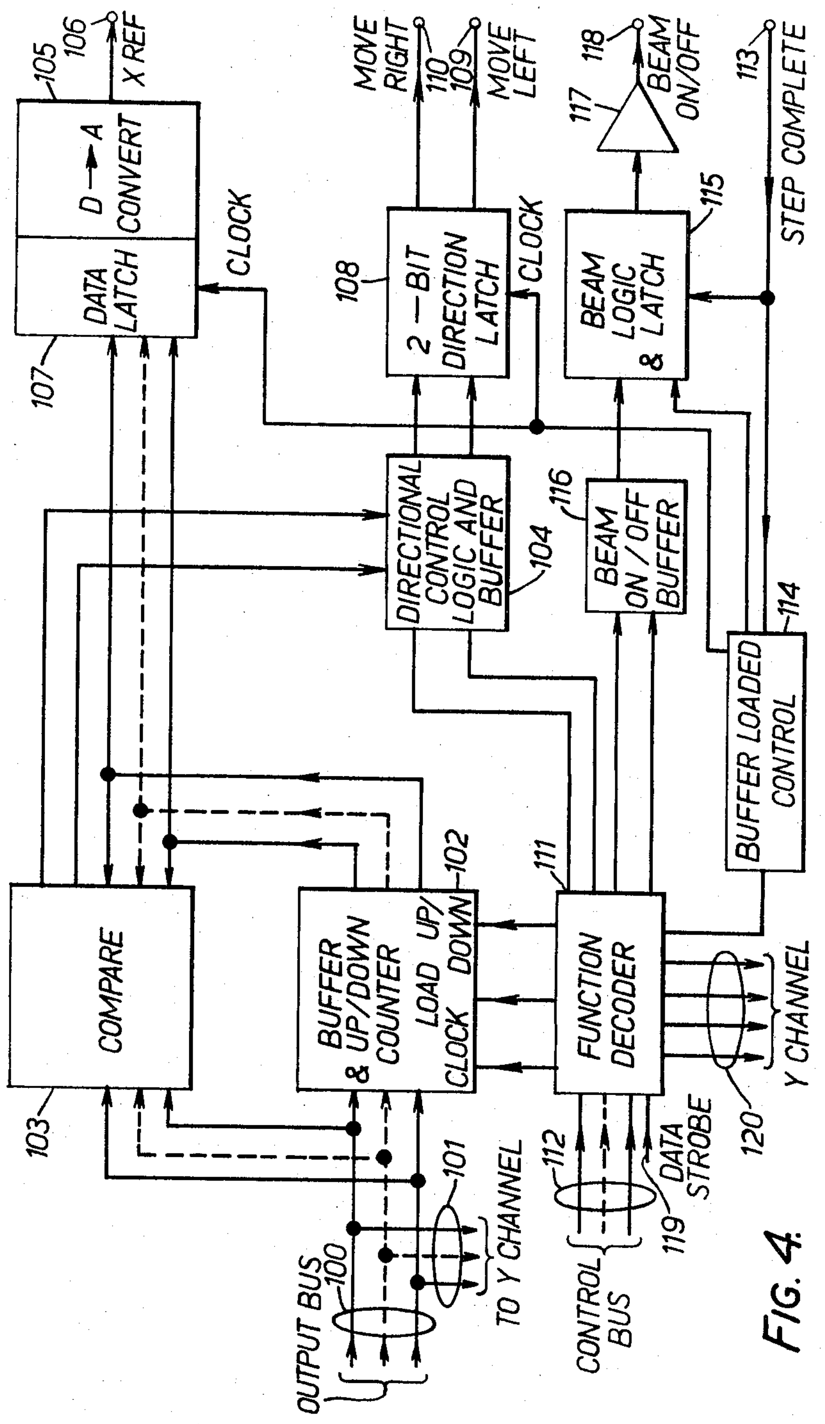
FIG. 4 shows digital circuitry for the same co-ordinate direction for providing control signals for the analogue circuitry in response to digital information derived from a computer defining the pattern required to be exposed.

The generation of the patterns to be exposed on the resist and the beedback control of position are achieved in two stages, a digital stage and an analogue stage. FIG. 3 is a circuit diagram for a suitable analogue circuit for handling the generation of deflection signals in the X direction, there being a similar circuit for deflection in the Y direction. FIG. 4 is a circuit of the digital components for deflection in the X direction, there being a similar stage for the Y direction; it will be appreciated that the functions of the digital components could be achieved by suitable programming of a general purpose computer, although probably it would be more economic to provide the special purpose circuitry shown. The circuits of FIGS. 3 and 4 are connected together, the terminals X REF, STEP COMPLETE, MOVE RIGHT and MOVE LEFT being joined.

Considering FIG. 3, the circuit shown receives an input reference signal X REF on terminal 70 and direction indicating signals to move right or left respectively applied to terminals 71 and 72, these signals being MOVE RIGHT and MOVE LEFT. These three signals are derived from the digital circuits of FIG. 4 and respectively represent the X coordinate of a point to which the electron probe is to be deflected and the direction in which the probe is to move parallel to that coordinate axis from its present position to the new position. It will be appreciated that the MOVE LEFT and MOVE RIGHT signals cannot both be present at the same time. The terminal 70 is connected to two comparison circuits 73 and 74 where X REF is compared with the previous X coordinate value derived from the storage circuit consisting of amplifier 75 with negative feedback capacitor 76. The comparator 73 produces an output when X REF is more positive than the value stored in the store 75, 76 and the output signal is applied to a gate 77 controlled by the MOVE RIGHT signal applied to terminal 71. Similarly the output from comparator 74 which is produced when X REF is more negative than the value stored is applied to an input of gate 78 controlled by the MOVE LEFT signal applied to terminal 72. The outputs of gates 77 and 78 are applied to control respective analogue switches 79 and 80 and also to respective inputs of a gate 81. Switches 79 and 80 receive respective reference inputs $+I_{SPEED}$ and $-I_{SPEED}$ from terminals 82 and 83 which are applied to the input of amplifiers 75 under the control of the outputs of gates 77 and 78 respectively. The output of amplifier 75 is amplified by amplifier 84 for application via terminal 85 to the X deflection coil. The output of gate 81 is applied to one input of a gate 86 and also to a monostable trigger 87, the output of which forms the other input to gate 86. Another monostable trigger 88 receives the output signal from gate 86 and generates the STEP COMPLETE signal which is applied to terminal 89 for application to the digital circuitry (FIG. 4).

As explained above a circuit similar to that of FIG. 3 is also provided for the Y coordinate signals except that the gate 81 and components 86, 87, 88 and 89 are common to both circuits, the two free inputs of the gate 81 being connected to the outputs of gates corresponding to 77 and 78 in the Y circuitry.

The MOVE LEFT and MOVE RIGHT signals indicating the direction in which the probe is to move help to nullify the effect of spikes in the outputs of the digital-to-analogue converters included in the digital circuitry produced during switching without causing the probe to stop.

In the operation of the circuit of FIG. 3, if the X REF signal represents a greater value of X than that stored in the store 75, 76, then the MOVE RIGHT signal is also applied to the terminal 71. As the X REF signal is larger than the stored signal the comparator 73 produces an output which when applied to gate 77 in conjunction with a MOVE RIGHT signals opens the analogue switch 79 to apply $+I_{SPEED}$ to the store 75, 76 to increase the stored value. When the stored values reaches X REF the output from comparator 73 ceases and the switch 79 is closed. When the value in store 75, 76 is to be reduced switch 80 is opened by the output of comparator 74 and the MOVE LEFT signal until the stored value falls to the level of X REF.

When both X and Y values stored are correct there are no inputs to gate 81 which in turn causes monostable trigger 88 to produce the STEP COMPLETE signal.

FIG. 4 shows the digital interface circuitry which received the information and control outputs from the computer and generates therefrom the signals for the analogue circuitry of FIG. 3. Apart from the function decoder and the beam control circuitry the components shown in FIG. 4 relate exclusively to the X coordinate deflection, there being similar components for the Y coordinate deflection.

The circuit of FIG. 4 receives on conductors 100 parallel coded digital information representing the X and Y coordinate information relating to the deflection positions required of the electron beam; the Y coordinate information is transferred along conductors 101 to the Y channel circuitry. Sixteen bits for each coordinate value would be adequate for a resolution of 0.75$\mu$ and a repeatability or alignment accuracy of 1$\mu$ . The X channel information is entered into a buffer store 102 and is also compared in comparator 103 with the previous X coordinate value stored in the buffer 102, the comparator 103 producing a MOVE LEFT or MOVE RIGHT output signal depending on whether the new value for X is smaller or larger than the previous value. The MOVE LEFT and MOVE RIGHT signals from the comparator 103 are applied to a directional control logic unit and storage buffer 104. The value stored in the buffer store 102 is also applied to a digital-to-analogue converter 105 which produces the analogue signal X REF at terminal 106. The converter 105 incorporates a latch 107 for retaining the digital signal until the number stored in the store 102 is changed. The directional control logic unit and buffer store 104 produce MOVE LEFT and MOVE RIGHT signals which are stored in a latch 108 to provide the MOVE LEFT or MOVE RIGHT output signal at terminal 109 or 110 respectively. The operations within the digital circuit are controlled by function decoder 111 under control of control signals from the digital computer received on the conductors 112. The STEP COMPLETE signal from the analogue circuit shown in FIG. 3 enters the digital circuit at terminal 113 and is applied to the buffer load control unit 114 and also to the beam logic unit and latch 115. The unit 114 applies clock signals to the latches 107 and 108 to regulate entry and change of data in these latches. A beam on/off buffer store 116 is provided controlled by the function decoder 111 and produces an output signal which is applied to the beam logic unit of latch 115 which in turn, via amplifier 117, generates a beam control signal at terminal 118 for application to the beam blanking coils 10 in the machine shown in FIG. 1. The function decoder 111 also receives a strobe input on conductor 119 and provides instructions for the Y channel over conductors 120.

The purpose of the digital circuitry shown in FIG. 4 is to provide the normal computer interface requirements for inserting and deriving data from the computer as required by the electron beam machine and in addition to buffer the output from the computer, decode the functions to be performed according to the control signals generated by the computer, perform the increment or decrement operations of the store coordinate values as required, derive the MOVE LEFT or MOVE RIGHT signals (or MOVE UP or MOVE DOWN for the Y coordinate direction), to switch off the electron beam when a STEP COMPLETE signal is received and no data is stored in the buffer store, that is at the end of the exposure, and to perform the necessary digital-to-analogue conversion for controlling the beam deflection. The derivation and use of the MOVE LEFT, MOVE RIGHT, MOVE UP, and MOVE DOWN signals would be unnecessary if the comparators 73 and 74 have a sufficiently high speed of operation.

To achieve the accuracy required of the patterns continuous realignment on the deflection markers spaced across the mask is used. The location of markers is effected under control of the computer which is arranged to adjust the gain of the deflection amplifiers via correction controls and introduce offset signals as required. The continuous realignment, whilst easily implemented, not only linearises the output but also compensates for drift in the system.

The detection of the markers has been described in outline above with reference to FIG. 21 and is controlled by the computer in the following way. The scan of the electron beam probe is initiated by the computer and in the computer a high speed counter begins counting from a 10MHs clock. The count continues upwards until the output from the secondary electron detector 23 (FIG. 1) passes above a preset threshold indicating the presence of a marker. The counter is then caused to count down until the scan by the electron beam probe is complete. The final total stored in the counter then indicates whether the marker in the left or right (above or below) the point of the initial and the final coordinates of the scan. By carrying out this procedure for scans in the opposite direction effects due to the width of the marker can be removed by averaging. The computer is then programmed to vary the scan position until the marker is exactly central, so that the computer then stores a representation of the position of the marker which can be used for offsetting the pattern generating instructions stored in the computer as described above. This procedure can be formed by various places along each limb of the marker to improve accuracy and reduce errors due to system noise or minor irregularities in the markers. For correcting scale errors the computer can be programmed to generate gain correction signals for the deflection amplifiers when such errors are detected, for example, by the presence of progressively increasing corrections being required as sucessive reference marks are located. The gain correction of the deflection amplifiers can conveniently be effected by the use of a digital - analogue multiplier connected to the input of a d.c. amplifier with resistive feedback, so that the magnitude of the current applied to the amplifier in response to the analogue signal representing the deflection required can be controlled by a digital signal from the computer applied to the multiplier.

Advantages of the invention include the fact that mask geometries required for production of integrated circuits, and in particular MSI and LSI integrated circuits, can be produced with a high degree of accuracy, with positional accuracies of better than one micron being achievable. During exposure of the resist, the control signal that is generated from the predetermined array of reference markings on the master blank, can be fed to a computer which controls the electron beam deflection thereby effecting continuous adjustment of the electron beam scan relative to the reference markings and ensuring accurate alignment of the mask geometry with the reference markings. Changes in mask geometry can be carried out in a relatively simple manner by appropriate changes in the programming of the computer which controls the electron beam deflection. This computer could be a small in-line computer which could interface with a larger computer enabling rapid production of masks, on a computer-aided design basis, to be achieved.

What we claim is:

1. A method for generating metal patterns on substrates comprising the steps of:

a. forming reference markings at a surface of a substrate:

b. coating said surface and said markings with a layer of electron beam sensitive resist;

c. scanning the reference markings in a first controlled manner with an electron beam to generate correction signals for alignment;

d. deflecting said electron beam in response to deflection signals representing the desired metal pattern, said deflection of the electron beam being positionally corrected by said correction signals for alignment to scan the electron beam sensitive resist in a second controlled manner with said electron beam to effect electron beam exposure of selected portions of said electron beam sensitive resist such that said exposed portions thereof are aligned with respect to said reference markings;

e. removing said exposed portions of electron beam resist to define a pattern therein corresponding with said desired metal patterns aligned with respect to said reference markings;

f. coating said patterned electron beam resist with a metal layer; and g. removing the unexposed portions of said electron beam resist together with portions of said metal layer of mask material overlying said unexposed portions of resist thereby leaving a desired metal pattern defined in said metal layer.

2. The method according to claim 1 wherein said electron beam sensitive resist is polymethylmethacrylate.

3. The method according to claim 1 wherein said substrate is a transparent plate.

4. The method of generating masks according to claim 1 wherein said metal is selected from the group consisting of aluminum and chromium.

5. A method for generating metal mask patterns on substrates comprising the steps of:

a. forming a first metal layer on a surface of a glass substrate;

b. forming a patterned resist layer on said first metal layer to leave uncovered selected areas of said first metal layer;

c. etching said uncovered selected areas of said first metal layer to form a selectively positioned array of reference markings in said first metal layer;

d. coating said first metal layer and said reference markings therein with a layer of electron beam sensitive resist;

e. scanning said electron beam resist in a first controlled manner with an electron beam to generate alignment correction signals indicative of relative displacements of said reference markings from respective predetermined alignment positions;

f. deflecting said electron beam in response to deflection signals corresponding with a desired mask pattern, said deflection of the electron beam being positionally corrected by said alignment correction signals to effect exposure of selected portions of said electron beam sensitive resist having preselected alignment relationships with said reference markings;

g. removing said exposed portions of electron beam resist thereby defining a pattern therein corresponding with said desired mask patterns aligned with respect to said reference markings;

h. coating said patterned layer of electron beam resist with a second metal layer; and i. selectively etching said unexposed portions of electron beam resist together with portions of said second metal layer overlying said unexposed portions or resist and further selectively etching portions of said first metal layer underlying said unexposed portions of said electron beam resist thereby leaving a desired mask pattern defined by portions of said second metal layer remaining on said substrate.

6. The method according to claim 5 wherein said resist is polymethylmethacrylate having an exposure sensitivity of at least $10^{-4}$ coulombs per square centimeter and said electron beam is energized to 10 KeV.

7. The method of generating a mask according to claim 5, wherein said first metal is gold and said second metal is selected from the group consisting of aluminum and chromium.

8. A method for genrating metal patterns on substrates comprising the steps of:

a. defining reference markings in a first metal layer on a surface of a substrate;

b. coating said surface and said reference markings with a layer of electron beam sensitive resist;

c. scanning said reference markings in a first controlled manner with an electron beam to generate correction signals for alignment;

d. removing said exposed portions of electron beam resist to define therein a pattern corresponding with a desired mask pattern;

e. scanning said electron beam over said electron beam sensitive resist in response to said correction signals to effect electron beam exposure of selected portions of said electron beam sensitive resist such that said exposed portions are aligned with respect to said reference markings;

f. coating said patterned electron beam resist layer with a second metal layer; and g. selectively removing unexposed portions of said electron beam resist together with portions of said second metal layer overlying said unexposed portions of resist and further removing portions of said first metal layer underlying said unexposed portions of resist, thereby leaving said desired metal patterns defined by portions of said second metal layer remaining on said substrate.

9. A method for generating metal mask patterns on substrates comprising the steps of:

a. forming a first metal layer on a surface of a glass substrate;

b. forming a patterned resist layer on said first metal to leave uncovered selected areas of said first metal layer;

c. etching said uncovered selected areas of said first metal layer to form a selectively positioned array of reference markings in said first metal layer;

d. coating said first metal layer and said reference markings therein with a layer of electron beam sensitive resist;

electrically grounding said markings;

f. scanning the electron beam resist over areas thereof corresponding to reference marking locations in a first controlled manner to generate secondary electron emission;

g. generating alignment correction signals in response to said secondary electron emission indicative of relative displacements of said reference markings from respective predetermined alignment positions;

h. deflecting said electron beam in response to deflection signals corresponding with a desired mask pattern, said deflection of the electron beam being positionally corrected by said alignment correction signals to effect exposure of selected portions of said electron beam sensitive resist having preselected alignment relationships with said reference markings;

i. removing said exposed portions of electron beam resist thereby defining a pattern therein corresponding with said desired mask patterns aligned with respect to said reference markings;

j. coating said patterned layer of electron beam resist with a second metal layer; and k. selectively etching said unexposed portions of electron beam resist together with portions of said second metal layer overlying said unexposed portions of resist and further selectively etching portions of said first metal layer underlying said unexposed portions of said electron beam resist thereby leaving a desired maks pattern defined by portions of said second metal layer remaining on said substrate.

* * * * *

UNITED STATES PATENT OFFICE
CERTIFICATE OF CORRECTION

Patent No. 3855023 Dated December 17, 1974

Inventor(s) Denis F. Spicer; Andrew C. Rodger

It is certified that error appears in the above-identified patent and that said Letters Patent are hereby corrected as shown below:

In the title page, left hand column, between "[21] Appl. No.: 390,275" and "Related U.S. Application Data", insert --[32] Priority Sept. 21, 1970
[33] Great Britain
[31] 44,935/70--

Signed and Sealed this

*eleventh* Day of *November 1975*

[SEAL]

*Attest:*

RUTH C. MASON
*Attesting Officer*

C. MARSHALL DANN
*Commissioner of Patents and Trademarks*